June 16, 1964 C. MACKIEWICZ 3,137,407
WEATHERPROOF LIFT COVER PLATE FOR ELECTRICAL WIRING DEVICES
Filed April 25, 1962
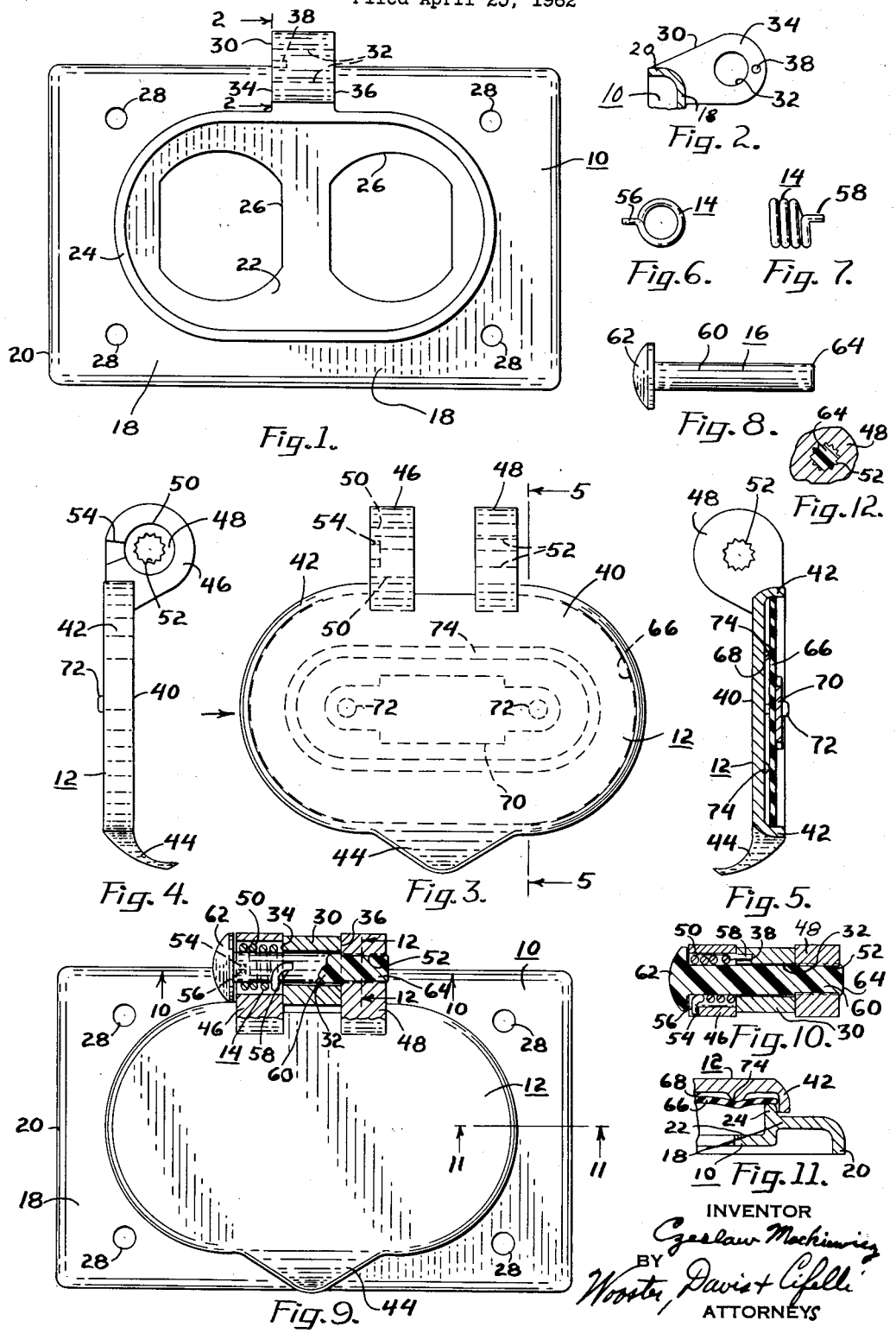
INVENTOR
Czeslaw Mackiewicz
BY Wooster, Davis & Cifelli
ATTORNEYS

United States Patent Office 3,137,407
Patented June 16, 1964

3,137,407
WEATHERPROOF LIFT COVER PLATE FOR ELECTRICAL WIRING DEVICES
Czeslaw Mackiewicz, Trumbull, Conn., assignor to Harvey Hubbell, Incorporated, Bridgeport, Conn., a corporation of Connecticut
Filed Apr. 25, 1962, Ser. No. 190,010
5 Claims. (Cl. 220—24.3)

This invention relates to protective devices for weatherproofing electrical wiring devices that are utilized out-of-doors or under corrosive conditions and which, therefore, must be protected from deterioration in some manner and yet remain readily accessible for utilization. The particular type of electrical wiring device to be protected has little bearing on the invention, other than that slight modifications must be made to protective devices embodying the invention when the protective devices are utilized with particular types of electrical wiring device, such as switches, receptacles or motor bases.

The electrical wiring device art has generally recognized the need for protective devices for electrical wiring devices that are used out-of-doors or in corrosive environments, and has provided various types of weatherproof plates, covers or plugs to protect electrical wiring devices mounted under such conditions. A serious particular problem, however, has developed in using protective devices of the weatherproof plate type heretofore provided by the art. One such type of weatherproof plate protective device used by the art has comprised an assembly of a metallic plate that is arranged to be mounted over an electrical wiring device and includes an opening for access thereto, and a lift cover hinged to the plate in position to overlie the opening in the plate. Spring means is usually incorporated in this assembly which normally biases the lift cover into closed position relative to the plate and its opening, and which may be overcome by forcibly manually pivoting the lift cover about its hinge to uncover the opening in the plate. The plate and the lift cover in the prior art assembly are usually made of a suitable noncorrosive metal, such as aluminum, and the hinge pin has been made of a ferrous metal or alloy, such as steel. When the prior art assembly was used in an out-of-doors or corrosive environment, the hinge portions of the plate and lift cover and the hinge pin experienced excessive corrosion and deterioration at their junctions, which resulted from the presence of dissimilar metals and the resultant electrolysis which occurred under certain atmospheric conditions. This deterioration resulted in a substantial reduction in the useful life of the prior art protective devices, as their hinge means deterioration ultimately resulted in their physical breakdown.

Another problem that has existed with prior art protective devices of the type being discussed is that their hinge pins require riveting to assemble them to the hinge portions of their plate and lift cover, and in many installations, such as where plural lift covers are independently hingedly mounted side by side on a single plate, there is not sufficient space to perform the operation of riveting over the ends of the hinge pin shanks.

It is an object of the invention to provide an improved protective device for electrical wiring devices wherein the above-discussed problems are eliminated.

The objects of the invention are accomplished in one form by the provision of a protective device comprising a metallic plate and metallic lift cover, and hinging them to each other by utilizing a hinge pin formed of a rigid plastic material of suitable structural strength which is chemically inert relative to and when associated with metallic elements under corrosive conditions, the hinge pin being constructed relative to the hinge portions of the plate and lift cover so as to be both operatively positioned and permanently mounted therein by the simple act of initially inserting it into said hinge portions and driving it into final position.

Other objects and further details of that which I believe to be novel and my invention will be clear from the following description and claims taken with the accompanying drawings, wherein:

FIG. 1 is a front elevational view of the main plate of one embodiment of the invention;
FIG. 2 is a sectional view taken substantially on line 2—2 of FIG. 1;
FIG. 3 is a front elevational view of the lift cover of the illustrated embodiment of the invention;
FIG. 4 is a side elevational view looking in the direction of the arrow in FIG. 3;
FIG. 5 is a sectional view taken substantially on line 5—5 of FIG. 3;
FIG. 6 is a side elevational view of a coil spring which forms part of the illustrated embodiment of the invention;
FIG. 7 is a front elevational view thereof;
FIG. 8 is an elevatoinal view of a hinge pin which forms a part of the illustrated embodiment of the invention in its condition prior to assembly.
FIG. 9 is a front elevation view, with portions broken away and shown in section for the sake of clarity, of all of the components of the illustrated embodiment of the invention in final assembled condition;
FIG. 10 is a sectional view taken substantially on line 10—10 of FIG. 9;
FIG. 11 is a sectional view taken substantially on line 11—11 of FIG. 9, and
FIG. 12 is a sectional view taken substantially on line 12—12 of FIG. 9.

In the drawings there is illustrated one embodiment of the invention which is designed for use with a duplex electrical receptacle. However, it should be clearly understood at the outset that, with minor design variations, as previously mentioned, it may be adapted for use with other types of electrical wiring devices, such as switches, motor bases and the like. The illustrated protective device comprises essentially a protective and mounting plate 10 illustrated by itself in FIGS. 1 and 2; a lift cover 12 illustrated by itself in FIGS. 3, 4 and 5; a coil spring 14 illustrated by itself in FIGS. 6 and 7, and a hinge pin 16 illustrated by itself in FIG. 8, all of these components being variously illustrated in their assembled condition in FIGS. 9–12.

Plate 10 comprises both a protective means and a mounting means for the entire protective device assembly. It is preferably made of a noncorrosive metal, such as aluminum, and may be cast or otherwise formed into its desired final configuration. It is generally rectangular and planar to cover the usual rectangular open front of a wall box that houses the electrical wiring device that is to be protected; however, its particular shape may vary. The plate 10 comprises a main planar wall portion 18 having a rearwardly extending peripheral flange 20, a central generally oval rearwardly offset wall portion 22 forming a shallow well that is defined and outlined by an oval forwardly extending rim flange 24 and includes a pair of appropriately shaped openings 26 for surrounding portions of the electrical receptacle that it covers to render them accessible through the plate 10. A plurality of openings 28 are formed through the main wall portion 18 to enable the passage of mounting means, such as screws, for rigidly and securely mounting the plate 10 to the open front of a wall box with its flange 20 in firm contact therewith and an appropriate sealing gasket therebetween if necessary or desired. Centrally at one side and integrally formed with the plate 10 is a hinge ear 30 that extends forwardly and is inclined slightly upwardly away from the main wall 18 with reference to FIG. 1.

Hinge ear 30 includes a circular bore 32 therethrough extending between a pair of flat parallel wall portions 34, 36. Formed in the hinge ear 30 through its wall 34 at one peripheral side of its bore 32 is a small partial bore 38.

The lift cover 12 is hinged to the plate 10 and comprises a means for closing and sealing the shallow well portion of the plate within the rim flange 24, and therefore, the electrical wiring device portions that are accessible through the openings 26 of the plate, and for protecting said portions and permitting access thereto. Lift cover 12 is preferably made of a noncorrosive metal, such as aluminum, and may be cast or otherwise formed into its desired final configuration. It is generally oval and planar; however, its particular shape may vary to cover the opening or openings in the protective and mounting plate with which it is associated. The lift cover 12 comprises a main planar wall portion 40 generally oval in outline and including a rearwardly extending, oval, peripheral flange 42 which is dimensioned so as to be slightly larger than and overlie the plate flange 24 (see FIG. 11). Centrally of one of its longer sides, the wall 40 has a finger grip tab 44 formed thereon which may be arcuately curved forwardly and downwardly as viewed in FIG. 3. Opposite the side of wall 40 at which the finger grip tab 44 is formed there is formed a pair of hinge ears 46, 48. Both hinge ears 46 and 48 are aligned and extend forwardly and are inclined slightly upwardly away from the main wall portion 40, as viewed in FIG. 3. A pair of co-axial openings 50, 52 are formed in the ears 46, 48, respectively. Opening 50 is plain and of larger diameter than opening 52 and opening 32 formed in plate hinge ear 30 (see FIG. 9). Opening 52 is formed by a serrated wall portion of cover hinge ear 48 which defines alternating axial ridges and grooves, and may be physically formed by either having been cast into such configuration or by being broached therein. At the rear side of ear 46, a radial notch 54 which extends partially axially through the ear is formed. As can best be seen in FIG. 3, the lift cover flange 42 is discontinued in the area between the hinge ears 46, 48 to enable the proper mounting of lift cover 12 on plate 10.

The coil spring 14 may be made of a spring steel and functions as a torsion spring between the plate 10 and the lift cover 12 which normally biases the latter into closed position relative to the former, but which may be manually overcome to allow pivoting of the lift cover to uncover the plate. Spring 14 comprises a plurality of coiled circular turns terminating at one end in a radially outwardly extending anchoring pin 56 and at its other end in an axially extending anchoring pin 58.

Hinge pin 16 prior to assembly comprises an elongated, smooth, plain, cylindrical shank 60 and an enlarged head 62 that is formed of a rigid plastic material which is structurally strong enough to function as a hinge pin for a pair of pivoted metallic members, which is chemically inert when associated with them under corrosive conditions and which is workable so as to allow its permanent assembly by being driven into an appropriate hinge ear opening. It has been found in practice that nylon or its equivalent is an extremely well suited material out of which to form the hinge pin 16.

To assemble the protective and mounting plate 10 and lift cover 12, the cover hinge ears 46, 48 are juxtaposed to the plate hinge ear 30 in the general relative positions indicated in FIG. 9, and the hinge pin 16 with the coil spring 14 loosely mounted thereon in position so that its anchor pin 58 projects away from the hinge pin head 62 in the same direction as the hinge pin shank 60 is inserted from the left in FIG. 9 through the hinge ear openings 50, 32 and 52 which are substantially coaxial at this time. FIG. 4 illustrates the side from which the hinge pin is inserted, and it will there be clearly seen that the plain opening 50 in cover hinge ear 46 is substantially larger than the serrated opening 52 in cover hinge ear 48. The outer diameter of the hinge pin shank 60 is plain, uniform and such as to freely pass through the opening 50 with the turns of the spring 14 disposed between the hinge pin shank and the portions of the hinge ear 46 forming said opening, and to be in bearing contact with the portions of the plate hinge ear 30 which form its opening 32; however, it is of larger diameter than the imaginary diameter formed by connecting the radially inner peaks of the serrations of hinge ear 48 forming the opening 52. At this stage in the assembly, the free end 64 of the hinge pin shank 60 has not yet entered the opening 52 and the condition of the spring 14 is such that its anchor pin 58 is readily disposed in the small partial bore 38 formed in the plate hinge ear 30. The spring 14 is then stressed by coiling it tightly and its radially projecting anchor pin 56 is disposed in the notch 54 in the cover hinge ear 46 in stressed condition and in such manner that it tends to unstress itself and in doing so it biases the lift cover 12 into closing contact with the plate 10. When the parts are in this stage of intermediate assembly, the hinge pin 16 is driven home, toward the right as viewed and into its final position illustrated in FIG. 9. An appropriate force applied to the hinge pin head 62 may be employed to drive the hinge pin home into final position. The step of driving the hinge pin 16 into final position causes its plain free end 64 to have a plurality of circumferentially spaced splines milled therein by the action of the serrated opening 52 forming walls of the hinge ear 48 digging into the material of shank end 64, and displacing it. When finally driven home, the hinge pin is rigidly and permanently secured to the cover hinge ear 48 by the interengagement of the splines formed on its free end 64 and the serrations of the opening 52, and therefore, in operation it is movable jointly with the lift cover and its hinge ears 46, 48; the head 62 of the hinge pin 60 covers the notch 54 and spring anchor pin 56 and retains them and the spring in assembled position, and the central portion of the hinge pin is in bearing contact with the bore 32 of the plate hinge ear 30 and functions as a pivot bearing when the lift cover is pivotally moved relative to the plate 10.

In order to enhance the seal between the plate rim flange 24 and the lift cover 12, sealing gasket means may be provided in the form of an oval resilient plate 66 of sealing material, such as rubber or the like, which may be secured to the inner side 68 of the cover 12 by an elongated metallic retainer plate 70 that is rigidly secured to the lift cover, as by the rivets 72 which may be conveniently formed integrally with the lift cover, passed through openings in the retainer plate and headed over, the overall arrangement being such as to sandwich the sealing plate 66 between the lift cover inner wall 68 and the retainer plate 70. In order to further enhance the sealing effect of the plate 66, an oval rib 74 is formed on the inner wall 68 of the lift cover and disposed so as to contact the sealing plate 66 inwardly of its periphery.

The foregoing constitutes a disclosure of one embodiment of my invention which eliminates the major problem of rapid deterioration of the hinging means of prior art protective devices of the type involved. It should be particularly noted that the utilization of a nylon, or equivalent material, hinge pin satisfies multiple objectives in that it is chemically inert when associated with metallic elements in a corrosive atmosphere; is structurally sufficiently strong to function as an assemblying means and hinge pin for the lift cover and main plate; is an admirable bearing material, and is readily worked in the assembly procedure so as to have splines formed in its free end which function to effectively and permanently secure the lift cover to the protective and mounting plate. A number of structural variations may be employed without departing from the invention. For example, the positions of the hinge ears may be reversed; that is, the pair of hinge ears (46, 48) may be formed on the protective and mounting plate and the single hinge ear (30) on the lift cover. Also, the invention may be in incorporated into protective devices for various types of electrical wiring devices, requiring only slight modification of the opening means in the protective and mounting plate to uncover the desired number and shape of openings to accommodate the electrical wiring device involved. Further, it is particularly well suited for incorporation into protective devices wherein a plurality of adjacent lift covers are individually hingedly mounted to a single mounting plate. In this type of protective device difficulty has been encountered in the past where metallic hinge pins requiring riveting at their free ends to affectuate assembly of the protective device were employed for there was not sufficient space available to perform the riveting operation on the free ends of the metallic hinge pins. In addition to satisfying the requirement of eliminating rapid deterioration and corrosion of the hinge pin and its associated parts of the hinge ears by employing a nylon or its equivalent hinge pin, applicant, in using a plastic material, selected a material which could not, for all practical purposes, be riveted; however, this seeming deficiency which resulted from utilizing what was otherwise a desirable material for hinge pins was overcome by employing the disclosed method of assembly of the hinge pin and hinge ears and transformed it into an asset for this method not only adequately provides for permanently securely attaching the nylon hinge pin to the hinge ears, but also eliminates the need for riveting, and therefore, lends itself admirably to incorporation of plural hinge pins into protective devices wherein plural, independently hinged, lift covers are employed and there is not sufficient space to employ riveted hinge pins.

As will be evident from the foregoing description, certain aspects of my invention are not limited to the particular details of construction of the examples illustrated, and I contemplate that various and other modifications and applications will occur to those skilled in the art. It is, therefore, my intention that the appended claims shall cover such modifications and applications as do not depart from the true spirit and scope of my invention.

What I claim as new and desire to secure by Letters Patent of the United States is:

1. A weatherproof lift cover plate for an electrical wiring device box comprising: a metallic plate; means for attaching said plate to a box housing an electrical wiring device; a metallic lift cover; means for hinging said lift cover to said plate comprising hinge ear means on both said plate and said cover having aligned openings formed therein, the hinge ear means on one of said plate or said lift cover comprising a pair of aligned openings, one of which pair of openings is smaller and formed by a wall with serrations defining alternating axial ridges and grooves, and a hinge pin formed of a rigid plastic material that is chemically inert relative to and when associated with said metallic elements in a corrosive atmosphere, said hinge pin having a shank that is cylindrical, plain and smooth prior to assembly and disposed to extend through all of said aligned openings on final assembly, the free end of said shank being of a larger diameter than said smaller opening prior to insertion, and after insertion being in tight frictional engagement with the serrated wall of said smaller opening and having axial splines, formed during insertion by the serrated wall, interengaging the serrations of said serrated wall, whereby said hinge pin is securely mounted.

2. The device defined in claim 1 wherein said hinge pin is made of nylon.

3. The device defined in claim 1 wherein a stressed metallic coiled torsion spring is disposed about said shank within the larger of said pair of openings and has an end anchored in said plate and another end anchored in said cover, whereby it functions to normally bias said lift cover into closed position relative to said plate.

4. The device defined in claim 3 wherein said lift cover and said plate are made of aluminum and said hinge pin is made of nylon.

5. The device defined in claim 1 wherein the opening in the hinge ear means on the other of said plate or lift cover is of a diameter intermediate those of said pair of openings; and the larger of said pair of openings surrounds a stressed metallic coiled torsion spring which is disposed about said shank and has an end anchored in said plate and another end anchored in said cover, whereby it functions to normally bias said lift cover into closed position relative to said plate.

References Cited in the file of this patent

UNITED STATES PATENTS

| | | |
|---|---|---|
| 2,867,345 | Bellek | Jan. 6, 1959 |
| 2,870,933 | Winter | Jan. 27, 1959 |
| 3,015,126 | Ahlgren | Jan. 2, 1962 |
| 3,042,961 | Tieri | July 10, 1962 |